June 26, 1945.　　　　M. I. TOPALOV　　　　2,379,324
STREAM MOTOR
Filed March 19, 1941　　　2 Sheets-Sheet 2
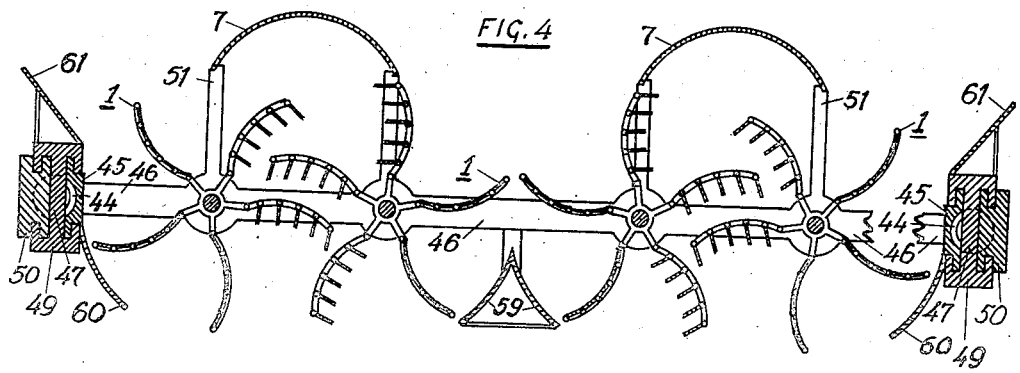
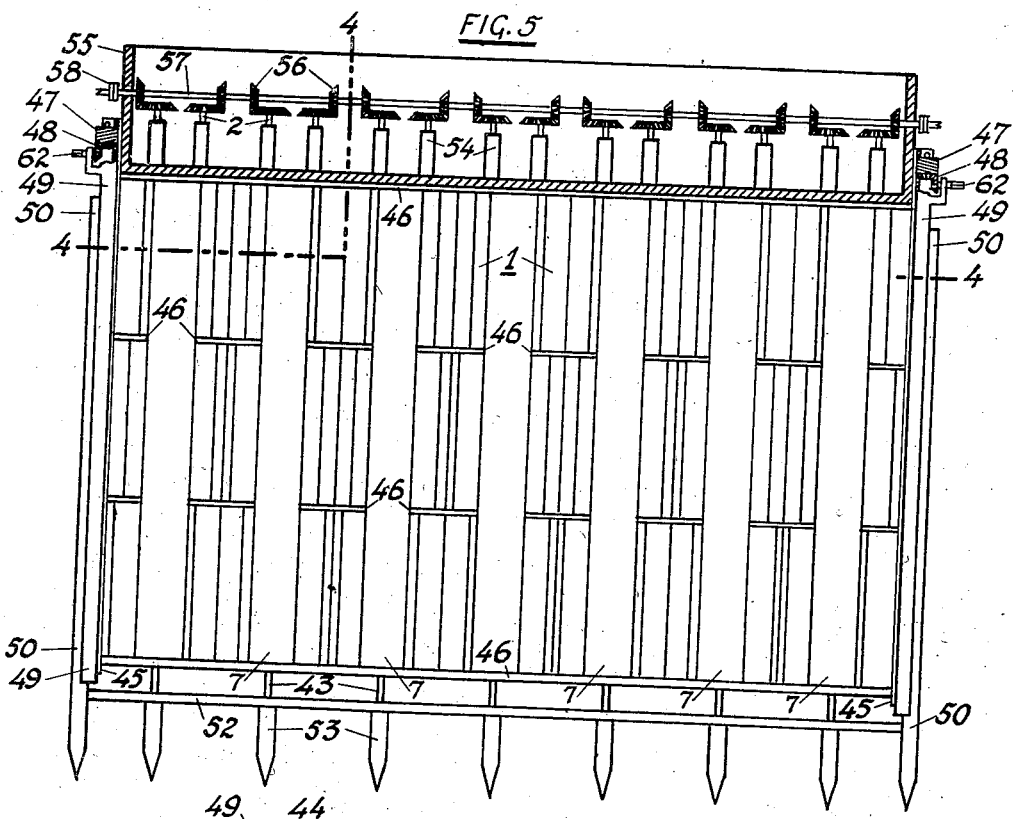
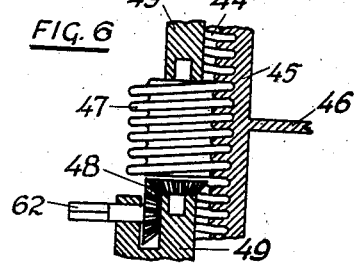
INVENTOR
Michael I. Topalov Patented June 26, 1945

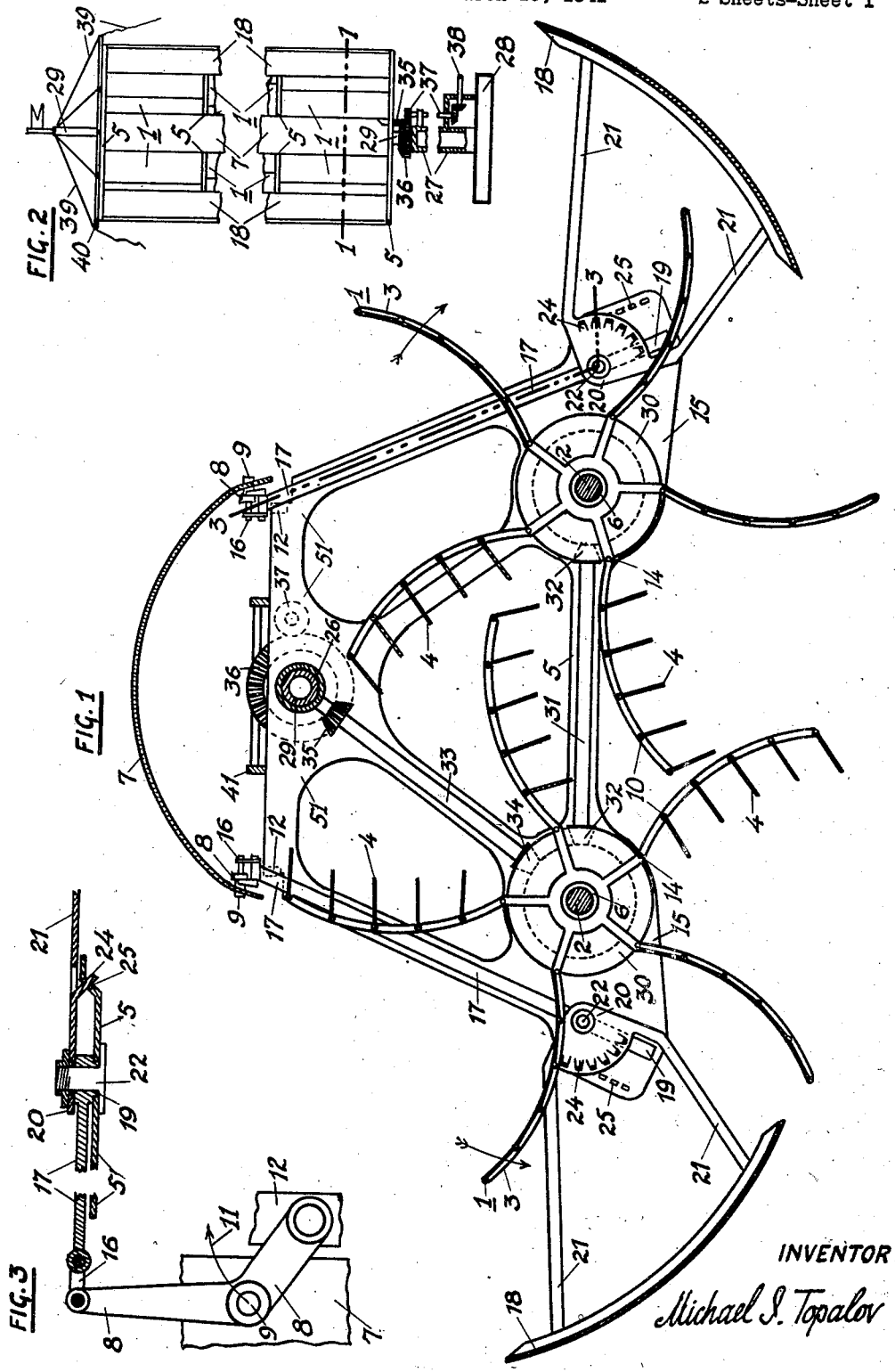

2,379,324

UNITED STATES PATENT OFFICE 2,379,324

STREAM MOTOR

Michael I. Topalov, Detroit, Mich.

Application March 19, 1941, Serial No. 384,104

7 Claims. (Cl. 170—23)

My invention relates either to water or to wind power motors which are composed of two or more rotors turning about vertical axes in opposite directions, and is a modification of the stream motors disclosed in my previous application Serial Number 316,149 filed in the U. S. Patent Office January 29, 1940, Division 9, room 4624.

It is an object of my invention to provide a simple and efficient rudderless motor to utilize either the wind or the natural flow of water without the aid of dams or the like.

It is also an object of my invention to provide a stream motor in which the size, the weight and the cost of construction may be directly proportional to the power capacity, permitting by this the construction of very large units and overcoming the obstacle existing in the construction of windmills of present type, in which, other conditions being equal, the weight of a windmill and its cost varies directly as the cube of the diameter of its wheel, while its power varies directly as the square of the wheel diameter. Hence in increasing the size of windmills of present type, the weight, and the consequent cost of material, increases more rapidly than the capacity, and it is not, therefore, found practicable to increase their size beyond a certain degree.

Another object of my invention at the same lateral spread and height to increase by several times the area of utilized wind passing through the mill structure, which is of a very small proportion in the present type windmills.

It is a further object of my invention to provide a wind motor in which the rotation may be automatically controlled or stopped in case of and by the power of an excessive wind pressure.

Still another object of my invention is to increase the utilization of the stream power by making the forward or leading side of vanes convex and the back or lagging side-concave, and to decrease the power losses by making said vanes composed of a plurality of narrow blades turnable automatically edgewise while moving in the inert area protected by the screen and assuming a position transverse to the stream when taking the stream pressure.

These and other objects of my invention will be apparent from the accompanying specification and claims, being also fully disclosed in the accompanying drawings in which—

Fig. 1 is a cross-sectional view of a single pair rudderless stream motor taken upon line 1—1 of Fig. 2.

Fig. 2 is a front elevational view of the upstream side of a single pair rudderless wind stream motor.

Fig. 3 is a sectional view taken upon line 3—3 of Fig. 1, showing the details of mechanism to control automatically the rotation by the force of wind pressure.

Fig. 4 is a cross-sectional view of a multi-rotor water stream motor, taken upon line 4—4 of Fig. 5.

Fig. 5 is a front elevational view of a large size multi-rotor water stream motor, and Fig. 6 is a partly sectional and detailed view of the mechanism for lifting up the motor from the water.

Referring more specifically to Fig. 1 of the drawings I have illustratively disclosed my improved stream motor as embodied either in a rudderless wind stream motor or a water stream motor, and Fig. 2 shows the special adaptation thereof for operation in a stream of air. This improved stream motor comprises two rotors 1 which are mounted and arranged to be rotated outwardly in opposite directions by the energy of the moving fluid of a stream to which the rotors are exposed. Each rotor consists of a vertical shaft 2 having a plurality of spiders 3 arranged in a vertical tandem order. Each spider has several arms preferably of arcuate conformation with a number of holes on each arm for pivotal support of a corresponding number of blades 4 which are vertically mounted on shafts 10 between corresponding arms of two vicinal spiders to form the vanes of the rotor for receiving the force of a flowing fluid; each blade's shaft 10 mounted on bearings to turn edgewise about its own axis while moving in the inert area protected by the screen 7 and to assume a position transverse to the streams when taking the stream pressure. For more efficiently converting the energy of the stream fluid impinging upon the vanes they are preferably curved in conformation of a straight line generated curved surface. The straight line elements of each curved vane are parallel to the axis of the shaft 2 and the curvature of the respective vanes is such that the forward or leading side is convex and the back or lagging side, which receives the stream pressure, is concave. The pivotal movement of each blade 4 is limited by the shaft 10 of the nearest blade, while the pivotal movement of the blade next to the shaft 2 is limited by a pin 14 mounted between the corresponding arms of two spiders.

The vanes of wind motor are preferably made of whole sheets, without division to a plurality of blades 4, because of small resistance offered by the quiet air behind the screen 7.

For supporting the rotors 1 in such a manner as to effectively expose the vanes thereof to the flowing fluid of a stream from which power is to be derived for remote utilization, I provide a supporting structure 5, which may be the top and bottom cross-beam members with the screen supporting extensions 51 each having suitable bearings 6 therein in which the rotor shafts 2 are journalled in spaced parallel relation for rotation on vertical axes and having also the flank extensions 15 to support the inflectors 18. A vertically elongated screen 7 is adjustably supported on the upstream side of the rotors 1. This screen 7 is preferably suitably curved, as shown, to divide the advancing stream with a minimum of friction for effectively delivering stream fluid toward the outer or opposite vanes for turning the rotors 1 in opposite directions with outer vanes moving in a down-stream direction and inner vanes moving in the up-stream direction behind and toward the screen 7. The outer or vertical edges of the screen 7 extend to a position substantially aligned in front of the shafts 2 of the rotors. Said screen 7 is adjustably suspended on the levers 8 by bolts 9 to be moved upward and backward by the force of an excessive wind pressure, as shown by the arrow 11, Fig. 3. The lower end of each lever 9 is rotatably adjusted to the supports 12 which are to strengthen and interconnect the extensions 51 of cross-beams 5. The upper end of lever 8 is connected to a rod 17 by means of an adjusting link 16 to unify the backward movement of the screen 7 with the same movement of two inflectors 18. The rear end of the rod 17 is adjusted to slide in the elongated rectangular hole 19 made in the flank extensions 15 of said cross-beam 5. A hub 20 with two stakes 21 of inflector 18 is rotatably adjusted to the upper side of rear end of the rod 17 on a pin 22 which passes through the hole in said rod 17 and said rectangular hole 19. A gear segment on the hub 20 has teeth 24 inclined downward to engage a straight line series of holes 25 made in said flank extensions 15. While the system of screen 7 and inflectors 18 is moved backward by the added force of an excessive wind pressure upon them, said teeth 24 engaging the holes 25 turn the inflectors 18 toward the screen 7 cutting off the wind from the rotors 1.

When the excessive wind pressure diminishes, the weight of the screen 7 pressing on the lever 8 moves said system of screen and inflectors 18 in the up-stream direction and again the teeth 24 engaging the holes 25 cause the inflectors to return into their original position beyond the flanks, as shown.

The inflectors 18 are of a vertical dimension substantially the same as the rotor, and are preferably curved, as shown, for greater efficiency, for controlling the impingement of fluid thereon in accordance with the force of wind pressure which automatically adjusts the angular position of inflectors 18. While open, as shown, the inflectors 18 extending beyond the flank sides of rotors substantially increase the amount of stream substance passing through the motor and they increase also about 50% the effective span of the motor by inflecting the current from remote sides upon the rear running vanes which have already passed the normal working position perpendicular to the general stream direction. The stream of wind or other stream substance coming against the motor, being compelled to pass through a small opening, is compressed and by this is forced to increase its velocity, converting it into the force of pressure. The inflectors 18 may also prevent the passage of the flowing fluid through the motor when turned inside to touch the screen 7 which is designed to protect the up-stream moving vanes from the stream pressure, to deflect the middle portion of the stream substance upon the outer vanes moving in the down-stream direction and to effect automatically the turning movement of inflectors 18 in cooperation with them using the united force of wind pressure. Said turning movement of inflectors may also be effected at any time by means of raising or lowering the screen 7.

A vertically disposed tube 26, cooperating with said supports 12, is also designed to interconnect said screen supporting extensions 51 and the cross-beams 5 into a supporting frame structure. To prevent any possible bending of elongated rotors by strong stream flow, a number of additional cross-beams is provided in various intermediate positions between the top and bottom cross-beams. Said additional cross-beams are affixed to the tube 26 and each has two holes through which passes the shaft of each rotor. This reinforces the rotors and creates a possibility to make the rotors 1 disproportionately high compared with rotors of same category not supplied with such reinforcing means. Such disproportionate increase in height provides a corresponding increase in the extracted power in such a manner as cannot be expected from the rotors designed without such reinforcing means.

The center of rotation of the frame, turning to face the direction of stream, coincides with the center of tube 26 and is in advanced position located in the apex of straight lines uniting said center with the centers of rotors and inflectors, so the stream pressure on rotors and inflectors, which are located behind both sides of the tube 26, would form a stable equilibrium which enables the motor to turn automatically and without the aid of a rudder to face the direction of stream. This elimination of rudder is a substantial improvement over the wind-motors of the same type but using the rudder. A mast 29 passes upwardly and concentrically through the tube 26 for pivotal support of the entire stream motor assembly. Mast 29 is firmly secured to the base 27 which is supported in a suitable foundation 28.

A bevel gear 30 is fixed at the lower end of all vanes of each rotor. A shaft 31 with two bevel gears 32 unifies the movement and the power of both rotors by engaging said two gears 30 respectively and coordinating the regular movement of inner vanes of both rotors which are meshing or entering between each other. Another shaft 33 with two bevel gears 34 and 35 is used for delivering the power from both rotors to a combined bevel-spur gear 36 which is revolving on the lower end of the mast 29 and from which the collected power is delivered to a train of suitable gears and shafts 37 and 38, Fig. 2, and to a remote point where it is to be utilized.

The mast 29 may be supported and strengthened by means of cables 39 secured to the top of the mast and inclined downwardly for anchoring on the ground at a substantial distance from the stream motor. A star of cross-bars 40 may be provided on the mast 29 for spreading the cables 39 over and away from the upper portion of the motor. 41 represents a suitable ladder leading to the top of the motor.

In the water motors, because of a steady stream pressure the construction may be simplified by omitting the parts shown at 8, 9, 11, 12, 15, 16, 17, 19, 20, 22, 24, 25, 26, 27, 28, 29, 30, 31, 32, 33, 34, 35, 36, 37, 38, 39, 40 and 41, and by arranging the upper and the lower parts of the motor in a manner shown on Fig. 5.

Fig. 4 is a cross-sectional view of a part of multi-rotor water stream motor, taken upon line 4—4 of Fig. 5 and shows a different embodiment of the stream motor shown on Figs. 1, 2 and 3. This embodiment has substantially similar parts with exception of the mast 29 which is replaced by two vertical frame stretchers 45 to which a plurality of horizontal cross-beams 46 is attached by means of the flank extensions 15. Each stretcher 45 is sliding in a vertical middle beam 49 and has on the outer side a rack 44 by means of which the motor may be elevated to a desired height over the water surface with the aid of a worm 47, Figs. 5 and 6, rotatably adjusted at the upper end of said middle beam 49 and actuated by a pair of bevel gears 48 and a crank stub 62. Each middle beam 49 is sliding vertically on a standard 50 for adjusting the motor automatically to the established level of immersion in the water. Both standards 50 are permanently anchored at the river's bottom Fig. 5. A screen 7 for each pair of rotors is steadily suspended on the front extensions 51 extending from the cross-beams 46.

To this motor may also be added the stream pressure keepers 59, two flank pressure keepers 60 and inflectors 61. The stream pressure keepers 59 and 60 are associated with the vanes of rotors for preserving from discharge into the space the stream pressure accumulated upon the down-stream moving vanes up to the time when the following vane may take the full pressure. Said pressure keepers are made in the form of the curved plates concentric with and adjacent to the peripheral edges of the orbit of down stream moving rotor vanes. The stream flowing between the adjoining pairs of rotors is divided into two parts by means of the pressure keepers, each part changing direction to flow behind the upstream running vanes where an area of negative pressure or vacuum is formed, and filling this vacuum. A pair of vertically extended inflectors 61 is attached to the front edge of each middle beam 49 to inflect into the motor a part of the stream fluid passing on both remote sides.

Fig. 5 shows the front elevational view of this particular adaptation of a multi-rotor water stream motor. Three sections of seven pairs of rotors 1 are shown to rotate between the four cross-beams 46 of the frame. The lower end of the motor may be slidingly anchored by means of a plurality of rods 43 sliding in the holes of a suitable foundation 52 laid upon the upper end of a corresponding plurality of tubes 53 driven into the bottom of the river. The upper end of each rotor shaft 2 pass up through suitable shaft sealing sleeves 54 in the boat or container 55, and by means of a train of suitable bevel gears 56 the power is collected from all individual rotors by the shaft 57 extending through the side of container 55 to the flexible couplings 58 and transmitted for remote use or may be used in the same container, as will be understood.

Fig. 6 shows partly sectional detailed view of the mechanism for lifting up the motor from the water to a desired height. 46 being a part of crossbeam, 45 being the part of frame stretcher with the rack 44, the worm 47 actuated by a pair of bevel gears 48 with the crank stub 62 adjusted to the upper end of the middle beam 49.

It is obvious that various modifications may be made in the apparatus herein shown and described, without departing from the principle of my invention and that those which are shown are only examples explaining approximative modes of use of the same stream motor, designed on the same principles.

I claim:

1. In a stream motor the combination of, a rudderless supporting frame structure arranged to face a stream of flowing fluid and comprising a plurality of horizontal cross-beams united by a vertical member, a pair of vertically elongated and axially aligned rotors pivotally supported by said cross-beams, each rotor comprising a vertical shaft, a plurality of spiders arranged on said shaft, and a number of vanes supported by said spiders, the inner vanes of both rotors meshing or entering between each other, all vanes being disposed in groups or sections, each vane section being composed of a series of vertically elongated blades pivotally mounted on blade shafts between the arms of each pair of said spiders, the pivotal movement of each blade being limited by the blade shaft of the nearest blade, front and flank extensions projecting from said supporting frame, a screen composed of one sheet and suspended on said front extensions in front and between the rotors, two inflectors mounted on said flank extensions for inflecting stream substance from the remote opposite sides, each blade turning edgewise about its own axis while entering the area protected by said screen and being disposed in a plane transverse to the stream direction while receiving the stream pressure, means for elevating the motor to a desired height, means to keep the motor at an established immersion, and a power shaft with gears for collecting and transmitting the power from the rotors.

2. In a stream motor the combination of, a rudderless supporting frame structure arranged to face a stream of flowing fluid and comprising a plurality of horizontal cross-beams and a vertical member uniting them, a pair of vertically elongated and axially aligned rotors pivotally supported by said cross-beams, each rotor comprising a vertical shaft, a plurality of spiders with arcuate arms arranged on said shaft, and a corresponding number of convex-concave vanes supported by said arcuate arms, the inner vanes of both rotors meshing or entering between each other, said vanes being disposed in groups or sections, each vane section being composed of a series of vertically elongated blades pivotally mounted on blade shafts between said arcuate arms of each pair of spiders, the pivotal movement of each blade being limited by the blade shaft of the next adjacent blade, front and flank extensions projecting from said frame, a screen composed of one sheet and suspended on said front extensions in front and between the rotors, two inflectors mounted on said flank extensions and projecting beyond the flanks of said motor for inflecting stream substance from the remote opposite sides, each blade turning edgewise about its own axis while entering the inert area protected by said screen and assuming a position transverse to the stream while in the stream area, means for elevating the motor to a desired height, means to keep the motor to an established immersion, and a power shaft with gears for collecting and transmitting the power from the rotors.

3. In a stream motor the combination of, a rudderless supporting frame structure arranged to face a stream of flowing fluid and comprising a plurality of parallel horizontal cross-beams united by a vertical member, two or more pairs of vertically elongated and axially aligned rotors pivotally supported by said cross-beams, each rotor comprising a vertical shaft, a number of spiders arranged on said shaft, and a number of vanes supported by said spiders, said vanes rotating between said cross-beams in spaced parallel relation, each vane section being composed of a series of vertically elongated blades, pivotally mounted on a blade shaft between the arms of two vicinal spiders, means limiting the pivotal movement of each blade, front extensions projecting from said supporting frame, a screen suspended on said front extensions in front and between the rotors of each pair, each blade turning edgewise about its own axis while entering the area protected by said screen and being disposed in a plane transverse to the stream direction while receiving the stream pressure, a pressure keeper on the down stream side between adjacent pairs of rotors and on each flank concentric with and spaced from the orbit of peripheral edges of the outer vanes of each pair of said rotors, means for elevating said frame structure to a desired height, and means for collecting and transmitting the power from the rotors.

4. In a stream motor the combination of, a supporting frame structure arranged to face a stream of flowing fluid and comprising a plurality of horizontal cross-beams united by a vertical member, two or more pairs of vertically elongated and axially aligned rotors pivotally supported by said cross-beams, each rotor comprising a vertical shaft, a plurality of spiders arranged on said shaft, and a number of vanes supported by said spiders, the inner vanes of each pair of rotors meshing or entering between each other, said vanes being disposed in groups or sections, each vane section being composed of a series of vertically elongated blades pivotally mounted on blade shafts between the arms of each pair of said spiders, means limiting the pivotal movement of each blade, front extensions projecting from said supporting frame, a screen suspended on said front extensions in front and between the rotors of each pair, each blade turning edgewise about its own axis while entering the inert area protected by the screen and being disposed in a plane transverse to the stream direction while in the stream area, a pressure keeper on the downstream side between adjacent pairs of rotors and on each flank concentric with and spaced from the orbit of peripheral edges of the outer vanes of each pair of said rotors, means for elevating said frame structure to a desired height, and means for collecting and transmitting the power from the rotors.

5. In a stream motor the combination of, a supporting frame structure arranged to face a stream of flowing fluid and comprising a pair of horizontal cross-beams united by vertical means, two or more pairs of vertically elongated and axially aligned rotors pivotally supported by said cross-beams, each rotor comprising a vertical shaft, a plurality of spiders with arcuate arms arranged on said shaft, and a number of convex-concave vanes supported by said arcuate arms, the inner vanes of each pair of rotors meshing or entering between each other, said vanes being disposed in groups or sections, each vane section being composed of a series of vertically elongated blades pivotally mounted on blade shafts between said arcuate arms of two vicinal spiders, means limiting the pivotal movement of each blade, front extensions projecting from said supporting frame structure, a screen suspended on said front extensions in front and between the rotors of each pair, each blade turning edgewise about its own axis while entering the area protected by said screen and assuming a position transverse to the stream while in the stream area, a pressure keeper on the motor's down-stream side between adjacent pairs of rotors and on each flank concentric with and spaced from the orbit of peripheral edges of the outer vanes of each pair of said rotors, means for elevating said supporting frame structure to a desired height, and means for collecting and transmitting the power from the rotors.

6. In a stream motor the combination of, a rudderless supporting frame structure arranged to face a stream of flowing fluid and comprising a top and a bottom horizontal rotor-supporting cross-beams, a plurality of intermediate rotor-reinforcing cross-beams, and a vertical means uniting said cross beams, one or more pairs of vertically elongated parallel and sectioned rotors pivotally supported and reinforced at every section by said cross-beams, each rotor comprising a vertical shaft, a plurality of spiders with arcuate arms arranged on said shaft, and convex-concave vanes supported by said arms, inner vanes of each pair of rotors meshing or entering each other, all vanes being disposed in sections to allow reinforcement at every section, each vane section being composed of a series of vertically elongated blades pivotally mounted on blade shafts between the arms of each pair of spiders, the pivotal movement of each blade being limited by the blade shaft of next adjacent blade, front and flank extensions projecting from said frame structure, a screen comprising a single curved sheet suspended externally on said front extensions in front and between the rotors of each pair, two inflectors mounted on said flank extensions and projecting beyond the sides of motor for inflecting stream substance from both flanks, each blade turning edgewise while entering the inert area and assuming a position transverse to the stream while in the stream area, a gear at the end of every rotor, and a horizontal power shaft with a train of gears meshing directly with the gears on rotors to unify and transmit the power.

7. In a stream motor the combination of, a rudderless supporting frame structure arranged to face a stream of flowing fluid and comprising a top and a bottom rotor-supporting cross-beam, a number of intermediate rotor-reinforcing cross-beams, and a vertical tube interconnecting said cross-beams, a pair of vertically elongated parallel and sectioned rotors pivotally supported and reinforced by said cross-beams, the center of said tube being located in the apex of straight lines connecting it with the center of said rotors to form a stable equilibrium, each rotor comprising a vertical shaft, a plurality of spiders arranged on said shaft, a corresponding number of vanes supported by said spiders, and a gear at the end of each rotor, said vanes being disposed in sections to allow reinforcement of said rotors, the inner vanes of both rotors meshing, front and flank extensions projecting from said supporting frame, a screen composed of a single curved sheet and suspended on said front extensions in front and between said rotors to protect the inner vanes from stream pressure and to deliver the stream fluid toward the outer vanes of both rotors, two inflectors pivotally mounted on said flank extensions and projecting beyond the flanks to inflect the stream substance from both remote sides of motor, means for unifying the backward-forward movement of said screen and said inflectors and for turning said inflectors inwardly or outwardly to regulate automatically the force of stream pressure on said vanes, a vertically fixed mast passing through said vertical tube, cables secured to the top of said mast and inclined downwardly for anchoring on the ground, a star for spreading said cables over and away from the upper part of the motor, and a horizontal power shaft with gears to collect and transmit the power from both said rotors.

MICHAEL I. TOPALOV.